(12) United States Patent
Kimura et al.

(10) Patent No.: US 8,657,449 B2
(45) Date of Patent: Feb. 25, 2014

(54) PROJECTION TYPE DISPLAY APPARATUS

(71) Applicant: Hitachi Consumer Electronics Co., Ltd., Tokyo (JP)

(72) Inventors: Nobuyuki Kimura, Yokohama (JP); Koji Hirata, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 13/933,720

(22) Filed: Jul. 2, 2013

(65) Prior Publication Data

US 2013/0293848 A1   Nov. 7, 2013

Related U.S. Application Data

(63) Continuation of application No. 12/909,525, filed on Oct. 21, 2010, now Pat. No. 8,500,285.

(30) Foreign Application Priority Data

Jan. 29, 2010 (JP) .................................. 2010-017633

(51) Int. Cl.
G03B 21/14 (2006.01)
(52) U.S. Cl.
USPC .......................................................... 353/20
(58) Field of Classification Search
USPC .......................................................... 353/20
See application file for complete search history.

(56) References Cited

U.S. PATENT DOCUMENTS

| 6,547,400 B1 | 4/2003 | Yokoyama |
| 7,537,347 B2 | 5/2009 | Dewald |
| 2005/0219464 A1 | 10/2005 | Yamasaki et al. |
| 2009/0262308 A1 | 10/2009 | Ogawa |
| 2009/0284148 A1 | 11/2009 | Iwanaga |
| 2009/0296047 A1 | 12/2009 | Maeda |

FOREIGN PATENT DOCUMENTS

| JP | 10-171045 | 6/1998 |
| JP | 2004-327361 A | 11/2004 |
| JP | 2004-341105 A | 12/2004 |
| JP | 2007-033577 A | 2/2007 |

(Continued)

OTHER PUBLICATIONS

Japanese Office Action, w/ partial English translation thereof, issued in Japanese Patent Application No. JP 2010-017633 dated Feb. 26, 2013.

(Continued)

Primary Examiner — Thanh Luu
Assistant Examiner — Renee Naphas
(74) Attorney, Agent, or Firm — McDermott Will & Emery LLP

(57) ABSTRACT

A projection type display apparatus includes: an illumination optical system which has a first array lens and a second array lens each of which has a plurality of lens elements having a plurality of rectangular shape openings and arranged in a matrix form; an illumination light source device which has one or more light sources having a polarization degree not smaller than 50% and one or more polarizers for transmitting one type polarized light and reflecting other type polarized light. At least one set of the light sources are arranged so that the polarization directions of light fluxes having high polarization degrees may be perpendicular to each other, the light fluxes are combined by the polarizer, condensed to a single region by a light-flux condensing element, and then directed toward another illumination optical system located in a subsequent stage.

2 Claims, 6 Drawing Sheets

(56) References Cited

FOREIGN PATENT DOCUMENTS

| | | |
|---|---|---|
| JP | 2008-003125 A | 1/2008 |
| JP | 2009-116165 A | 5/2009 |
| JP | 2009-259583 A | 11/2009 |
| JP | 2009-277516 A | 11/2009 |
| JP | 2009-288408 A | 12/2009 |

OTHER PUBLICATIONS

Entire Prosecution of U.S. Appl. No. 12/909,525, filed Oct. 21, 2010 to Nobuyuki Kimura entitled "Projection Type Display".
Japanese Office Action issued in Japanese Patent Application No. JP 2010-017633 dated Nov. 12, 2013.

PROJECTION TYPE DISPLAY APPARATUS

CROSS REFERENCE TO RELATED APPLICATIONS

The present application is the U.S. Continuation Application of U.S. application Ser. No. 12/909,525, filed on Oct. 21, 2010, which in turn claims the benefit of Japanese Application No. 2010-017633, filed on Jan. 29, 2010, the content of which is hereby incorporated by reference into this application.

BACKGROUND OF THE INVENTION

The present invention relates to a projection type display apparatus which projects a video or image on a projection surface with use of image display elements such as liquid crystal display elements, to a light source device which has a plurality of light source units and which condenses light fluxes from the plurality of light source units into a single light flux and then projects the condensed light flux onto an illumination optical system provided in a subsequent stage, and also to a technique for providing a highly-efficient projection type display apparatus without increasing the size of the light source.

In a projection type display apparatus for displaying, in an enlarged manner, an image plane of reflection or transmissive liquid crystal panel or a display screen, created by an image display element made of a plurality of very small or micro mirrors arranged thereon, on a screen, a board or the like as a projection surface, such an illumination optical system has been devised that an enlarged image having a sufficient magnitude and a brightness on a projection surface can be obtained.

In a system using a plurality of image display elements, in particular, various types of illumination optical systems have been suggested to suppress degradation of the white color balance of color images or color shading thereof. As a light source for use in the illumination optical system of the projection type display apparatus disclosed, for example, in JP-A-10-171045, an ultra high voltage mercury lamp having a high luminous efficiency (70 lm/w) per unit input power is predominantly employed.

In order to increase transmissivity in a first or a second array lens, on the other hand, it is required to reduce a distance between electrodes as a big development issue. Since the ultra high voltage mercury lamp generates a large quantity of ultra violet ray, which applies a large stress to an organic material such as a liquid crystal light valve or a polarizing plate forming the illumination optical system so that this causes big issues of life reduction of the valve or the polarizing plate as well as generation of brightness reduction in a short period of time by devitrification caused by electrode wear or by a haze phenomenon of a luminous tube.

To avoid the above issues, many projection type display apparatuses using red, green or blue light emitting diodes or using a solid-state light emitting element such as organic electroluminescence elements has been proposed as a new light source. In JP-A-2004-341105, for example, there is suggested a light source device which includes a solid-state light source, a phosphor layer which converts ultra violet light emitted from the solid-state light source into visible light, and a transparent base material.

Further, in order to solve the problem in JP-A-2004-341105, there is suggested a light source device in which a solid-state light source can emit exciting light even as visible light at high efficiency, as shown, for example, in JP-A-2009-277516.

There is also suggested a light source device in a projection type display apparatus which includes a combination of light source units based on different light emission principles, for example, in JP-A-2009-259583.

In the technique disclosed in JP-A-2004-341105, there is shown a light source device which includes a solid-state light source, a phosphor layer for converting ultra violet light emitted from the solid-state light source into visible light, and a transparent base material. In this technique, since an exciting light source for using ultra violet light having a high energy as exciting light is employed, an optical component illuminated with the ultra violet light tends to be more damaged and thus it becomes difficult to secure the performance of the optical component throughout a long period of time. To avoid this, it is suggested to illuminate a phosphor layer with visible light having an energy lower than ultra violet light as an exciting light in JP-A-2009-277516.

Also as shown in JP-A-2009-259583, there is a new light source device in a projection type display apparatus which includes a combination of a plurality of types of light source units based on different light emitting principles. In this suggestion, the light source device includes a first light source unit as a light emitting diode or a solid-state light emitting element for emitting light having a predetermined wavelength, a second light source unit as a light emitting diode or a solid-state light emitting element for emitting exciting light, and a third light source unit for emitting light having the same wavelength range as the first light source unit as an exciting energy.

SUMMARY OF THE INVENTION

The prior art techniques disclosed in the aforementioned JP-A-2004-341105, JP-A-2009-277516, and JP-A-2009-259583 have a problem that, though no description of the size of the light source device, when a plurality of such exciting light source units are actually arranged, the light source device becomes large in its size. When the plurality of exciting light source units are arranged, a lens for condensing the exciting light onto the phosphor layer becomes large in its size. Furthermore, these prior art techniques also involve another problem that the spherical aberration of the lens is increased and thus the phosphor layer is not illuminated with light of desired illumination shapes.

Explanation will be made as to problems in an illumination optical device when an exciting light source unit uses light excited by a phosphor layer is used as a new light source device not using an ultra high voltage mercury lamp, with reference to the accompanying drawings. In this connection, in the drawings, constituent elements having the same functions are denoted by the same reference numerals or symbols, and a repetitive explanation thereof is omitted. For easy understanding of the subsequent explanation, a Cartesian coordinate system is employed. In the system, a Z axis denotes illumination light optical axis, a Y axis denotes an axis in a direction parallel to a long side of a rectangular effective illumination region of image display elements in a plane perpendicular to the Z axis, and an X axis denote an axis in a direction parallel to a short side of the rectangular effective illumination region. That is, lens cells constituting a first or second array lens are assumed to be arranged in the both directions of X and Y axes.

FIG. 3A schematically illustrates optical elements arranged on an optical path of an illumination optical system from a light source until liquid crystal display elements in a projection type liquid crystal display apparatus using a polarization conversion integrator, and also illustrates major constituent elements of the illumination optical system in a YZ sectional plane including an illumination optical axis as viewed from the X axis direction.

In FIG. 3A, an illumination light source device 300 includes eight blue exciting light source elements 1 arranged in the Y axis direction, and collimating lenses 2 for collimating light emitted from the light source elements. The light fluxes emitted from the blue exciting light source elements 1 are collimated by the respective collimating lenses 2 and then condensed by a condensing lens 14 into a transparent base material 19. An antireflective coat is deposited on an incident side of the transparent base material 19, and an exit side of the transparent base material 19 has two segments, that is, one being a yellow phosphor for emitting yellow light by blue light as exciting light, and the other being a diffusion layer for diffusing the blue light.

FIG. 3B illustrates a YZ cross-sectional view as viewed from the X axis direction and an XY cross-sectional view as viewed from the Z axis direction. A dichroic coat 191 for transmitting blue light and for reflecting yellow light (green and red) is deposited on the yellow phosphor segment, and a yellow phosphor layer 192 is applied on the dichroic coat 191. Since the blue exciting light reacts with the yellow phosphor layer 192, yellow light is omnidirectionally emitted. However, since yellow diffusion light toward the incident side of the transparent base material 19 is reflected by the dichroic coat 191, all the yellow light is diffused toward a collimating lens 20.

The segment of a blue color diffusing layer 193 diffuses blue light toward the collimating lens 20. When the rotational speed of the transparent base material 19 is sufficiently high, white light as a combination of the blue light and yellow light looks to the naked eye like being emitted from the transparent base material 19. In other words, it can be considered that the illumination area of the transparent base material 19 illuminated with the blue exciting light emits the white light as a white light source. The yellow and blue light diffused from the transparent base material 19 becomes parallel by the collimating lens 20 and then incident on a polarization conversion integrator.

The polarization conversion integrator includes an optical integrator having a first array lens 3 and a second array lens 4 for providing uniform illumination, and also includes a polarization conversion element 5 for changing or aligning a polarization direction to a predetermined polarization direction.

The first array lens 3 includes a plurality of lens cells arranged in a matrix form which divide incident light into a plurality of light beams and then efficiently guide and pass the divided light beams through the second array lens 4 and the polarization conversion element 5. In other words, the first array lens 3 is provided so that illuminated images on the transparent base material 19 have an object/image (conjugate) relationship with the respective lens cells of the second array lens 4. The light passed through the lens cells of the first array lens 3 is required to enter the cells of the second array lens 4 opposed thereto.

Similarly to the first array lens 3, the second array lens 4 having a plurality of lens cells arranged in a matrix form projects the shapes of the lens cells of the first array lens 3 on a liquid crystal display element 18 through the corresponding lens cells of the second array lens 4.

At this time, the light emitted from the second array lens 4 is changed and aligned to a predetermined polarization direction, and the projected images of the respective lens cells of the first array lens 3 pass through a condensing lens 6 and a condenser lens 13 and then overlapped on the liquid crystal display element 18.

By the second array lens 4 and the condensing lens 6 provided adjacent to the second array lens 4, the first array lens 3 has an object/image (conjugate) relationship with the liquid crystal display element 18 so that a plurality of light fluxes divided by the first array lens 3 are projected on the liquid crystal display element 18 to be overlapped with one another via the second array lens 4 and the condensing lens 6, thereby an illumination having an illumination distribution at a high uniformity level causing practically no problem can be obtained.

Now attention will be directed to the illumination shape of the blue exciting light illuminated on the transparent base material 19. Since the illumination area of the blue exciting light illuminated on the transparent base material 19 becomes a light source image incident on the illumination optical system, the illumination area of the blue exciting light capable of being captured by the illumination optical system is uniformly determined. Thus, for the purpose of reducing the influence of the aberration of a condensing lens 14, it becomes necessary to condense the blue exciting light to the transparent base material 19. To this end, it becomes necessary to increase a distance between the condensing lens 14 and the transparent base material 19 and to reduce light obliquely incident on the transparent base material 19.

On the other hand, it is required for the condensing lens 14 to capture all the blue light emitted from the arranged eight blue exciting light source elements 1 and made parallel by the collimating lenses 2, and therefore the condensing lens 14 is required to have a size corresponding to the arranged blue exciting light source elements 1. This requires a distance between the condensing lens 14 and the transparent base material 19 to be considerably long. As a result, this causes a problem that the entire size of the light source device becomes large.

In view of the above problems in the prior arts, an object of the present invention is to provide a highly-efficient projection type display apparatus which uses a light source device having a plurality of light sources, and wherein, when light fluxes emitted from the light source device are condensed to a single light flux and then incident on an illumination optical system provided in a subsequent stage, the light source device can be avoided from becoming larger in its size than the prior art.

In accordance with an aspect of the present invention, the above object is attained by providing a projection type display apparatus which includes an illumination light source device, an image display element, an illumination optical system having a plurality of optical elements for illuminating the image display element with light from the illumination light source device, and a projection lens for enlarging an optical image formed by the image display element and for projecting the enlarged image. The illumination optical system has a first array lens and a second array lens each of which has a plurality of lens elements having a plurality of rectangular opening shapes and arranged in a matrix form. The illumination light source device has one or more light sources having a polarization degree not smaller than 50% and one or more polarizers for transmitting one type polarized light and reflecting the other type polarized light. At least one set of the light sources are arranged so that the polarization directions of light fluxes having high polarization degrees are perpendicular to each other, the light fluxes are combined by the polarizer, the light fluxes are condensed by a light-flux condensing element to a single region, and then directed toward an illumination optical system located in a subsequent stage.

In accordance with another aspect of the present invention, there is provided a projection type display apparatus which includes an illumination light source device, an image display element, an illumination optical system having a plurality of optical elements for illuminating the image display element with light from the illumination light source device, and a projection lens for enlarging an optical image formed by the image display element and for projecting the enlarged image. The illumination optical system has a first array lens and a second array lens each of which has a plurality of lens elements having a plurality of rectangular opening shapes and arranged in a matrix form. The illumination light source device has one or more light sources having a polarization degree not smaller than 50%, one or more polarizers for transmitting one type polarized light and for reflecting the other type polarized light, and one or more polarization conversion elements. At least one set of the light sources are arranged so that the polarization directions of light fluxes having high polarization degrees are perpendicular to each other, light fluxes are combined by the polarizer, and polarization directions of the combined light fluxes are changed and aligned by the polarization conversion element. Two sets of the light sources are provided, the polarization directions of the light fluxes changed and aligned by the polarization conversion element are perpendicular to each other, the light fluxes are combined by the polarizer provided in a subsequent stage of the two sets of illumination light source device, the light fluxes are condensed to a single region by a light-flux condensing element, and then directed toward an illumination optical system located in a subsequent stage.

In accordance with a further aspect of the present invention, there is provided a projection type display apparatus which includes an illumination light source device, an image display element, an illumination optical system having a plurality of optical elements for illuminating the image display element with light from the illumination light source device, and a projection lens for enlarging an optical image formed by the image display element and for projecting the enlarged image. The projection type display apparatus further includes an element for condensing light fluxes from the illumination light source device, the light fluxes are condensed by the light-flux condensing element to an opening on an incident side of a light tunnel having four reflection surfaces and then guided thereinto. The light fluxes exiting from an exit side opening of the light tunnel are projected by the lens element on an optical modulating element for modulating an intensity of input light according to an image signal. The illumination light source device has one or more light sources having a polarization degree not smaller than 50%, and one or more polarizers for transmitting one type polarized light and for reflecting the other type polarized light. At least one set of the light sources are provided, the polarization directions of light fluxes having high polarization degrees are perpendicular to each other, the light fluxes are combined by the polarizer, and condensed by the light-flux condensing element to a single region, and then directed toward an illumination optical system located in a subsequent stage.

In accordance with yet another aspect of the present invention, there is provided a projection type display apparatus which includes an illumination light source device, an image display element, an illumination optical system having a plurality of optical elements for illuminating the image display element with light from the illumination light source device, and a projection lens for enlarging an optical image formed by the image display element and for projecting the enlarged image. An element for condensing light fluxes from the illumination light source device is provided, the light fluxes are condensed by the light-flux condensing element to an opening on an incident side of a light tunnel having four reflection surfaces, the light fluxes exiting from the incident side opening of the light tunnel are projected by the lens element on an optical modulating element for modulating an intensity of its incident light according to an image signal. The illumination light source device has one or more light sources having a polarization degree larger than 50%, one or more polarizers for transmitting one type polarized light and for reflecting the other type polarized light, and one or more polarization conversion elements. At least one set of the light sources are provided so that directions of light fluxes having high polarization degrees are perpendicular to each other, the light fluxes are combined by the polarizer, and polarization directions of the combined light fluxes are changed and aligned by the polarization conversion element. Further, two sets of the illumination light source devices are provided, the polarization directions of the aligned light fluxes are made to be perpendicular to each other by the polarization conversion element, the light fluxes are combined by the polarizer provided in a subsequent of the two sets of the illumination light source devices and condensed by a light-flux condensing element to a single area, and then directed toward the illumination optical system provided in a subsequent stage.

In accordance with the present invention, there is provided a highly-efficient projection type display apparatus, when a light source device having a plurality of light sources are used and when light fluxes from the light sources are condensed into a single light flux and then directed toward an illumination optical system provided in a subsequent stage, which can avoid an increase in the size of the light source device when compared with the prior art.

DETAILED DESCRIPTION OF THE EMBODIMENTS

Figure 1A:
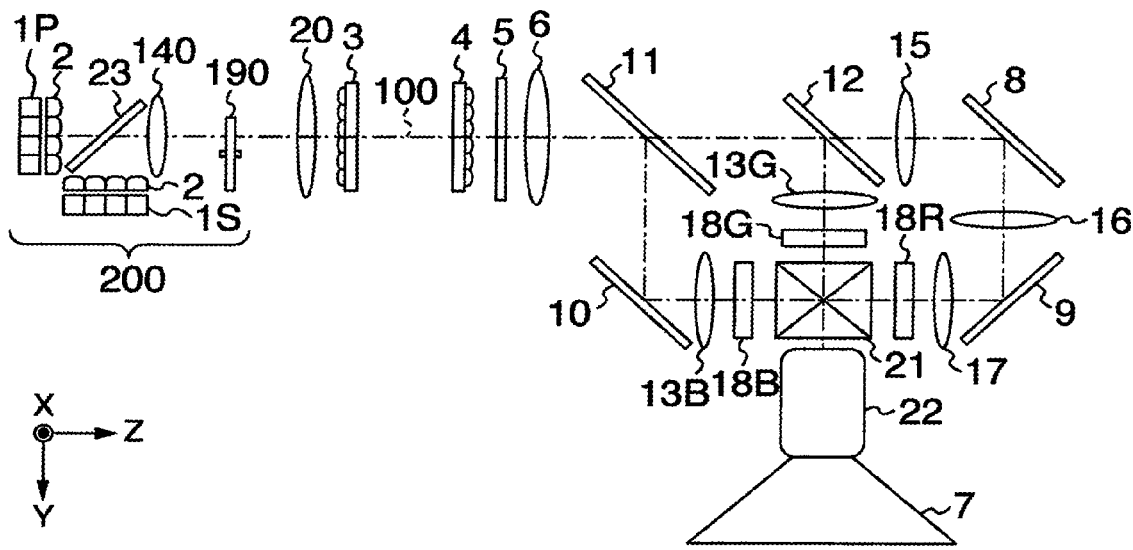
FIG. 1A schematically illustrates an arrangement of a projection type liquid crystal display apparatus in accordance with an embodiment of the present invention.

The present invention will be explained as to embodiments of the invention by referring to the attached drawings. In the drawings, constituent elements having the same functions are denoted by the same reference numerals or symbols, and a repetitive explanation thereof is omitted. Even in the explanation to be given below, a Cartesian coordinate system having a Z axis as an illumination optical axis is employed, as in the above section of BACK GROUND OF THE INVENTION for easy understanding of the present invention. That is, a Y axis denotes an axis in a direction parallel to a long side of a rectangular illumination effective region of an image display element in a plane perpendicular to the Z axis, and an X axis denotes an axis in a direction parallel to a short side of the rectangular effective display region.

Figure 1B:
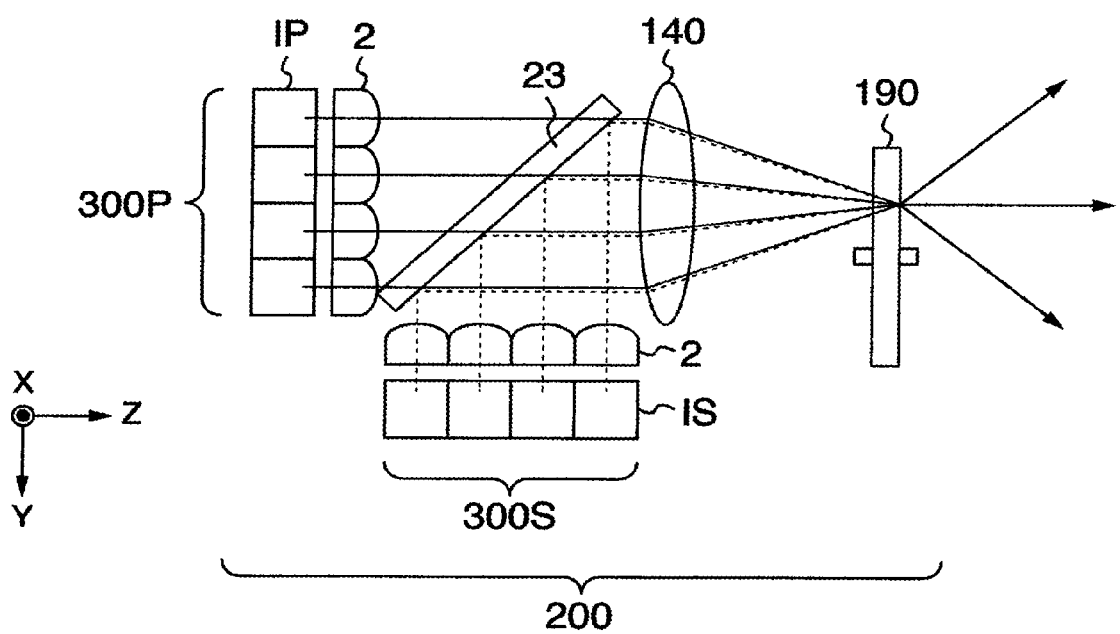
FIG. 1B schematically illustrates a structure of a part of the arrangement of FIG. 1A.

FIGS. 1A and 1B schematically illustrate an arrangement of an optical system of a projection type liquid-crystal display apparatus according to an embodiment and a structure of an illumination light source device used in the projection type display apparatus respectively. FIG. 1A schematically illustrates an arrangement of the major part of the projection type liquid-crystal display on a YZ cross-sectional plane including an illumination optical axis 100 as viewed from the X axis direction. FIG. 1B illustrates a structure of the major part of the illumination light source device including the illumination optical axis as viewed from the X axis direction.

In FIG. 1A, the light fluxes emitted from an illumination light source device 200 (to be detailed later) become nearly parallel through a collimating lens 20 and then directed to a polarization conversion integrator. The polarization conversion integrator includes an optical integrator having a first array lens 3 and a second array lens 4 for providing uniform illumination, and also includes a polarization conversion element 5 for changing and aligning a polarization direction to a predetermined polarization direction.

The first array lens 3 has a plurality of lens cells which form a nearly rectangular shape similar to a liquid crystal display element as viewed from an illumination optical axis direction and which are arranged in a matrix (two-dimensional) form. The first array lens functions to split light incident from the light source device into a plurality of light beams through the plurality of lens cells and to guide and pass the light efficiently through the second array lens 4 and the polarization conversion element 5. More specifically, the first array lens 3 is designed to have an optically conjugate relationship between a light emission surface of a transparent base material 190 in the illumination light source device 200 and each of the lens cells of the second array lens 4.

Similarly to the first array lens 3, the second array lens 4, having a plurality of lens cells which form a rectangular shape as viewed from the illumination optical axis direction and which are arranged in a matrix form, functions to project (map) shapes of the lens cells of the first array lens 3 associated with the lens cells of the array lens 4 onto a liquid crystal display element 18.

At this time, polarization directions of light emitted from the second array lens 4 are changed and aligned by the polarization conversion element 5 to a predetermined polarization direction. And the projection image of each lens cells of the first array lens 3 passes through a condensing lens 6, condenser lenses 13B, 13G, a first relay lens 15, a second relay lens 16, and a third relay lens 17, and then overlapped with one another on the liquid crystal display element 18.

Since the second array lens 4 and the condensing lens 6 provided close thereto are designed so that the lens cells of the first array lens 3 have an optically conjugate relationship with the liquid crystal display element 18, a plurality of light fluxes split by the first array lens 3 are projected on the liquid crystal display element 18 by the second array lens 4 and the condensing lens 6 to be overlapped with one another. As a result, illumination having an illumination distribution of a high level of uniformity causing practically no troubles can be obtained.

As has been explained above, the polarization conversion integrator including the first array lens 3, second array lens 4 and the polarization conversion element 5 can provide uniform illumination to the liquid crystal display element by changing and aligning light having random polarization directions from the light source device to the predetermined polarization direction.

In the course of the above operation, for example, B light (light in a blue region) is reflected by a dichroic mirror 11, G light (light in a green region) and R light (light in a red region) are transmitted therethrough and split into two color light beams. The transmitted G and R light fluxes are separated by a dichroic mirror 12 into G and R light fluxes. For example, the G light is reflected by the dichroic mirror 12 and the R light is transmitted trough the dichroic mirror 12 and then split into three color light beams. The light splitting method can be considered in various manners. The R light may be reflected by the dichroic mirror 11 and the G and B light may be transmitted through the dichroic mirror 11. Alternatively, the G light may be reflected by the dichroic mirror 11 and the R and B light fluxes may be transmitted therethrough.

The B light reflected by the dichroic mirror 11 is reflected by a reflecting mirror 10, passes through a condenser lens 13B, passes through a liquid crystal display element 18B, and then incident on a light combining prism 21.

On the other hand, the G light in the G and R light fluxes pass through the dichroic mirror 11 is reflected by the dichroic mirror 12, pass through a condenser lens 13G; incident on a G-light liquid crystal display element 18G, pass through the G-light liquid crystal display element 18G and then incident on the light combining prism 21. The R light is passes through the dichroic mirror 12, condensed by the first relay lens 15, reflected by a reflecting mirror 8, further condensed by the second relay lens 16, reflected by a reflecting mirror 9, further condensed by the third relay lens 17, and then incident on a R-light liquid crystal display element 18R. The light passed through the R-light liquid crystal display element 18R is incident on the light combining prism 21.

The B, G and R light fluxes passed through the respective liquid crystal display elements are combined by the light combining prism 21 as a color image, passes through a projection lens 22 such as a zoom lens, and finally reach a screen 7. An optical image formed on the liquid crystal display element 18 through optical intensity modulation is projected on the screen, being enlarged by the projection lens 22, and so that this optical system has functions as a display device.

Though no relay lens is used in a first optical path (B light) and a second optical path (G light), the relay lenses 15 and 16 are used in a third optical path (R light) in order to make the lengths of the optical paths of the B and G light fluxes equal.

Explanation will be made as to why a small-size or compact illumination light source device can be provided according to the present embodiment, with reference to FIG. 1B. In the same drawing, the illumination light source device 200 includes a light source unit 300P, a light source unit 300S, a polarizer 23, a condensing lens 140, and a transparent base material 190. The light source unit 300P has four light source elements 1P arranged in the Y axis direction and a collimating lens 2 for collimating light fluxes emitted from the light source elements 1P. A light source unit 300S has four light source elements 1S arranged in the Z axis direction and a collimating lenses 2 for collimating light flux emitted from the light source elements 1S.

The light source element unit 1 has a high polarization degree in a specific direction. Assume now that S polarization denotes a polarization in the X axis direction, P polarization denotes a polarization in a direction perpendicular to the illumination optical axis, the light source 1S has a polarization ratio of the S polarization larger than 50%, and the light source elements 1P have a polarization ratio of the P polarization larger than 50%. Though laser is well known as a light source having a high polarization degree, a light source may be employed such that a polarizer for transmitting only one linear polarized light immediately after light emission of a non-polarized light source such as LED to extract only one linear polarized light is provided. When using a laser light source, it may be located such that a linear polarized light direction may be parallel to the X axis in order to obtain the S polarized light, whereas it may be located to be perpendicular by 90 degrees to the S polarized laser in order to obtain the P polarized light.

With such an arrangement of the non-polarization light source that a polarizer extracts only one type polarization, the location direction of the polarizer may be made to be perpendicular by 90 degrees. The light fluxes emitted from the light source unit 300P have a P polarized light ratio larger than 50% and are parallel to each other. The light fluxes emitted from the light source unit 300S, which have an S polarized light ratio larger than 50% and which are parallel to each other, are incident on the polarizer 23. The polarizer 23 is an element for transmitting the P polarization and for reflecting the S polarization. The polarizer may be a prism form made of triangular columns two surfaces of which are bonded together.

Thus, the P polarized light in the light emitted from the light source unit 300P passes through the polarizer 23, while the S polarized light in the light emitted from the light source unit 300S is reflected by the polarizer 23 and then incident on the condensing lens 140. Since the light source unit 1 has a polarization degree larger than 50%, the light source unit 1 can produce a light flux larger than, for example, when the light fluxes from the four light source elements 1P are simply incident on the condensing lens 140. The light fluxes incident on the condensing lens 140 are concentrated on the transparent base material 190 to form a single illumination region.

Hit is assumed that the light source unit 1 is a blue color exciting light source, the transparent base material 190 may have a constitution which has two segments for blue color diffusion layer and for yellow color phosphor, similarly to the aforementioned transparent base material 190. When the light source unit 1 is made of light source elements of blue, green and red colors, for example, when the light source element unit 1 is made of, eight light source elements including two red color light source elements, four green color light source elements, and two blue light source elements; the transparent base material 190 may have a constitution including only a diffusion layer for diffusing incident light beams. The light fluxes passed through the transparent base material 190 are guided into an illumination optical system provided in a subsequent stage as an emitted image of a single white color light source which is a single illumination region of the transparent base material 190.

By arranging the constituent elements of the illumination light source device as mentioned above, the condensing lens 140 is only required to capture only light fluxes which are emitted from the light source unit 1 of four arranged light source elements and which are collimated through the collimating lenses 2. That is, since a light flux width is made half of a light flux width in the prior art, the condensing lens 140 can be made compact. Thus, a distance between the condensing lens 140 and the transparent base material 190 can be also reduced without increasing the aberration of a projected image on the transparent base material 190.

Figure 2A:
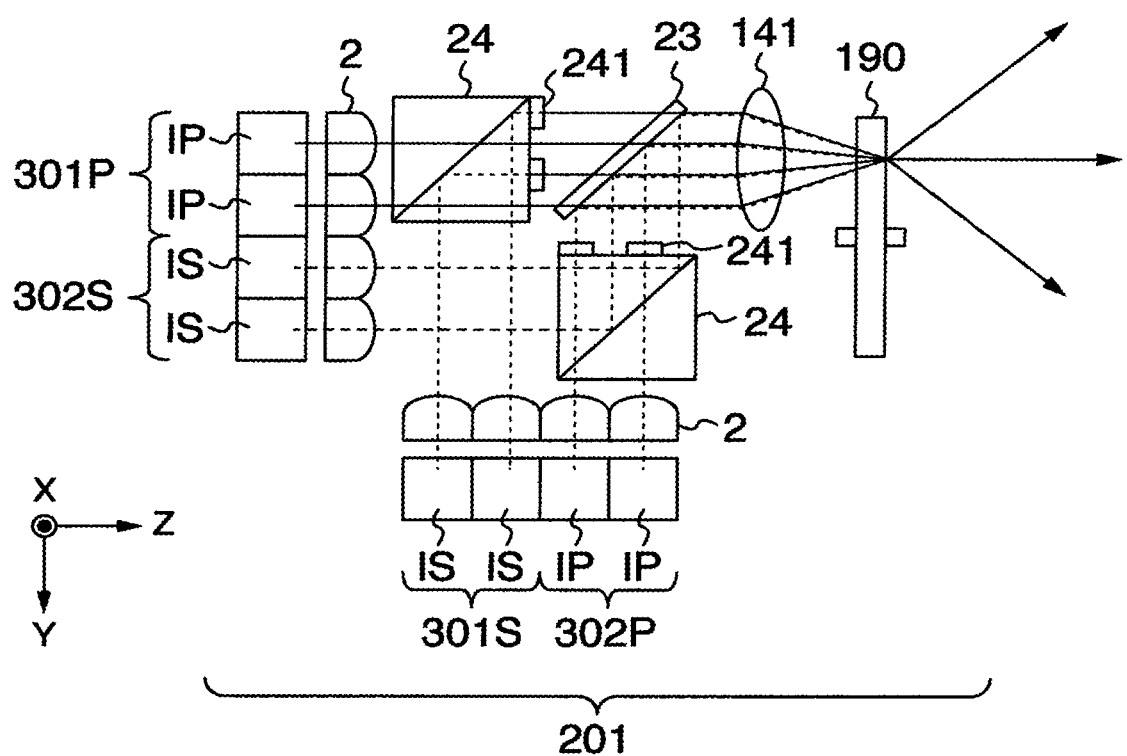
FIG. 2A schematically illustrates an arrangement of an illumination light source device in one embodiment of the present invention.
Figure 2B:
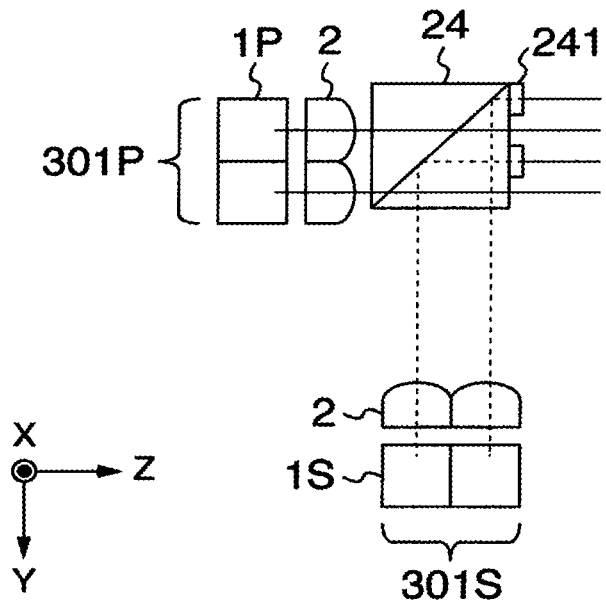
FIGS. 2B and 2C schematically illustrate structures of parts of the arrangement of FIG. 2A respectively.
Figure 2C:
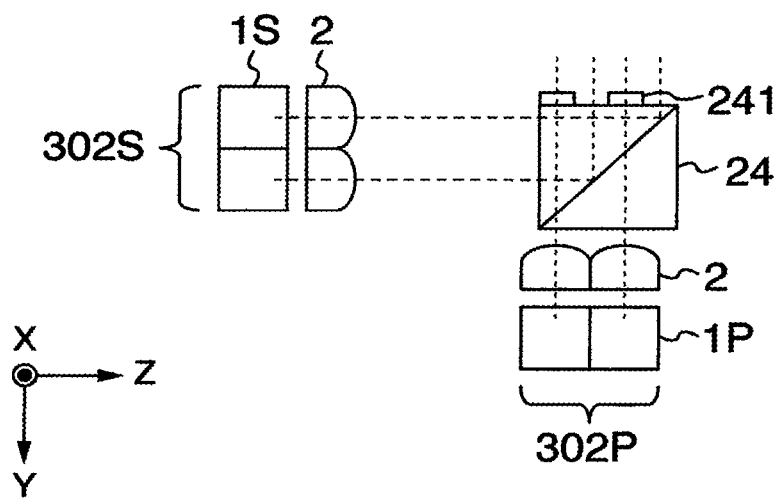
Figure 3A:
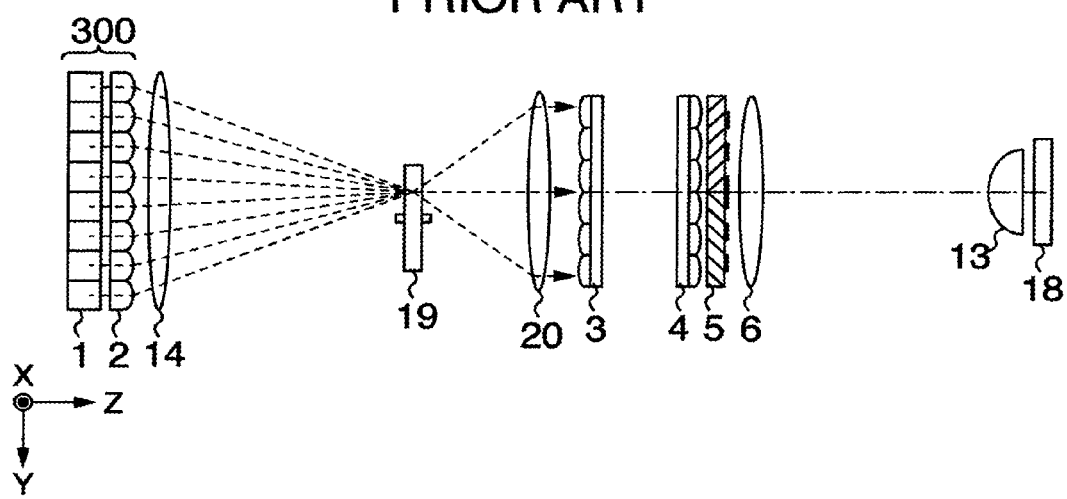
FIG. 3A schematically illustrates an arrangement of a prior art projection type liquid-crystal display apparatus.
Figure 3B:
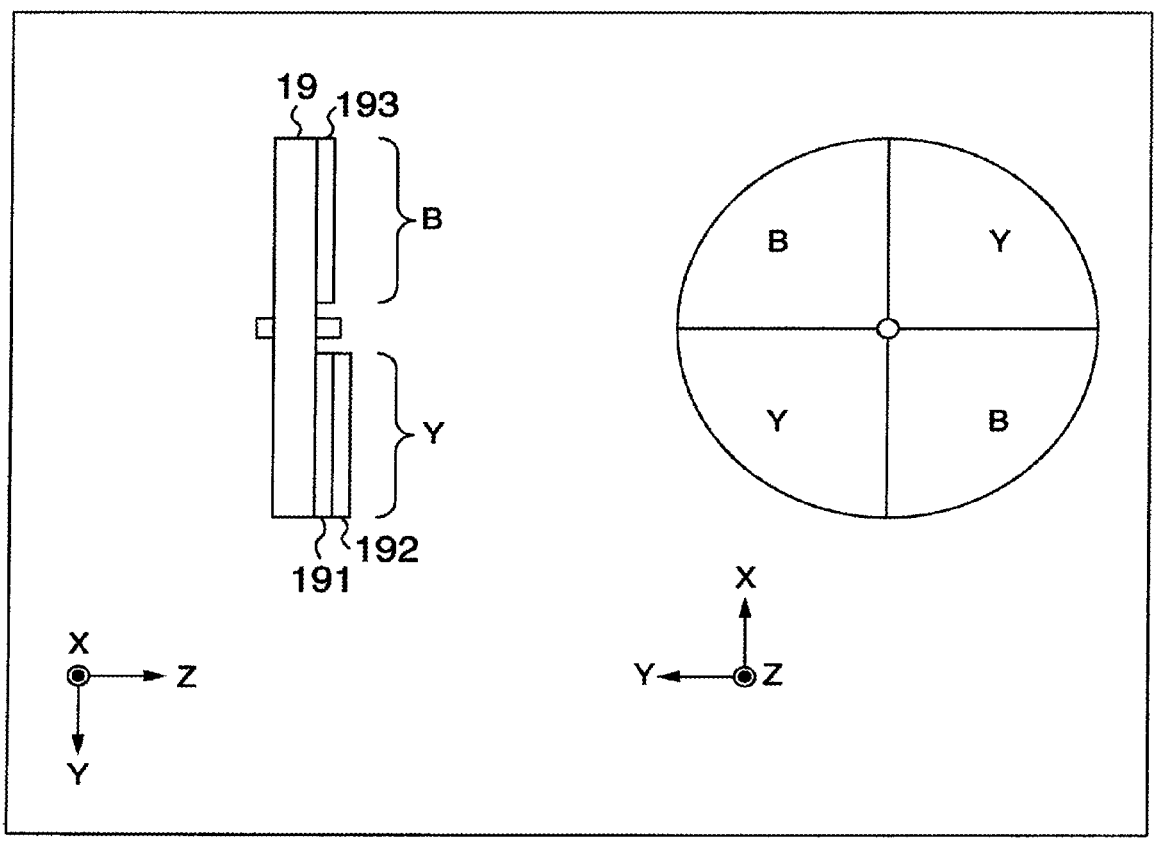
FIG. 3B schematically illustrates a structure of a major part of the arrangement of FIG. 3A.

Explanation will next be made as to a method of further reducing the light flux width and making the light source device compact, by referring to FIGS. 2A to 2C. FIGS. 2A to 2C schematically illustrate an arrangement of an optical system of an illumination light source device 201 according to an embodiment of the present invention and structures of the parts of the illumination light source device. More in detail, FIG. 2A schematically illustrates an arrangement of the major part of the illumination light source device 201 in a YZ cross-sectional plane including the illumination optical axis as viewed from the X axis direction; and FIGS. 2B and 2C illustrate parts of the illumination light source device.

In FIG. 2A, the illumination light source device 201 includes a light source unit 301P, a light source unit 301S, a light source unit 302P, a light source unit 302S, a polarizer 23, a polarizing prism 24, a condensing lens 141, and a transparent base material 190. The illumination light source device 201 is made of a light source section having a light source unit 301 and a light source section having a light source unit 302, which are illustrated in FIGS. 2B and 2C, respectively.

FIG. 2B illustrates a device including the light source unit 301. In the drawing, the light source unit 301P has two light source elements 1P arranged in the Y axis direction and collimating lenses 2 for collimating the light fluxes emitted from the light source elements 1P. The light source unit 301S has two light source elements 1S arranged in the X axis direction and collimating lenses 2 for collimating the light fluxes emitted from the light source elements 1S.

The light fluxes emitted from the light source unit 301P have a P polarization light ratio larger than 50% and are parallel to each other. The light fluxes emitted from the light source unit 301S have an S polarized light ratio larger than 50% and are parallel to each other. The light fluxes are both incident on the respective polarizing prisms 24. The polarizing prism 24 is an element for transmitting the P polarized light and for reflecting the S polarized light. Ralf wave plates 241 of a strip shape are provided on a light exit side of the polarizing prism 24.

The P polarized light in the light emitted from the light source unit 301P passes through the polarizing prism 24 and reaches an exit surface thereof. At this time, the light source unit 301P is located so that the light fluxes emitted from the light source unit 301P pass through regions where the half wave plates 241 are not located. Accordingly, the light fluxes emitted from the light source unit 301P pass through the polarizing prism 24 in the form of P polarized light as it is.

The S polarized light in the light emitted from the light source unit 301S is reflected at a light reflecting surface of the polarizing prism 24 and reaches the exit surface thereof. At this time, since the light source unit 301S is located so that the light emitted from the light source unit 301S passes through regions where the half wave plates 241 are located, the light emitted from the light source unit 301S is converted from S polarized light to P polarized light and then passes through the polarizing prism 24. That is, the light emitted from the light source unit 301P and the light emitted from the light source unit 301S both are emitted from the polarizing prisms 24 as P polarized light fluxes.

Explanation will then be made as to another light source unit. FIG. 2C illustrates a device including a light source unit 302. The light source unit 302S has two light source elements 1S arranged in the X axis direction and a collimating lens 2 for collimating the light fluxes emitted from the light source elements 1S. The light source unit 302P has two light source elements 1P arranged in the Z axis direction and a collimating lens 2 for collimating the light fluxes emitted from the light source elements 1P.

The light fluxes emitted from the light source unit 302P have a P polarized light ratio larger than 50% and are parallel to each other. The light fluxes emitted from the light source unit 302S have an S polarized light ratio larger than 50% and are parallel to each other, and then incident on the polarizing prism 24. The polarizing prism 24 is an element for transmitting the P polarized light and for reflecting the S polarized light. Half wave plates 241 of a strip shape are provided on a light exit side of the polarizing prism 24. The S polarized light in the light fluxes emitted from the light source unit 302S is reflected at a reflecting surface of the polarizing prism 24 and reaches a light output surface.

At this time, since the light source unit 302S is located so that the light fluxes emitted from the light source unit 302S may pass through regions where the half wave plates 241 are not provided, the light fluxes emitted from the light source unit 302S pass through the polarizing prism 24 in the form of S polarized light as it is.

The P polarized light in the light emitted from the light source unit 302P passes through the polarizing prism 24 and reaches the light exit surface. At this time, since the light source unit 302P is located so that the light emitted from the light source unit 302P may pass through regions where the half wave plates 241 are provided, the light emitted from the light source unit 302P is converted by the half wave plates 241 from P polarized light to S polarized light and then passes through the polarizing prism 24.

That is, the light emitted from the light source unit 302S and the light emitted from the light source unit 302P both are emitted from the polarizing prism 24 in the form of light fluxes of S polarized. Though the polarizing prism 24 has been explained as a single member including the half wave plates, the polarizing prism may be made of separated members of a polarizer for combining the polarized light and half wave plates for rotating the polarized light.

In FIG. 2A, the polarizer 23 is an element for transmitting the P polarized light and reflecting the S polarized light. Accordingly, since the light fluxes emitted from the light source unit 301 are incident on the polarizer 23 in the form of the P polarized light as has been explained above, the light fluxes pass through the polarizer 23 and exit from the condensing lens 141. Since the light fluxes emitted from the light source unit 302 are incident on the polarizer 23 in the form of S polarized light as has been explained above, the light fluxes are reflected by the polarizer 23 and exit from the condensing lens 141. The light fluxes incident on the condensing lens 141 are condensed by the transparent base material 190 to form a single illumination region.

By arranging the members of the illumination light source device as mentioned above, the condensing lens 141 is required to capture only the light fluxes which are emitted from the light source element unit 1 of the arranged two light source elements and collimated through the collimating lenses 2. That is, the light flux width is one fourth of the light flux width in the prior art. As a result, the condensing lens 141 can be made small in size. Thus the distance between the condensing lens 141 and the transparent base material 190 can also be reduced.

Explanation has been made in the above in connection with a case where the light source element unit 1 is made of arranged eight light source elements. However, the number of such light source elements is not limited to eight and may be a number other than eight. The collimating lens 2 may be modified to have an optimum size, curvature radius and glass material according to the location orientation of the light source, light color thereof and so on.

As has been explained above, according to the present invention, when a light source device having a plurality of light sources is used and when light fluxes from the light source device are condensed to a single light flux and then incident on an illumination optical system provided in a subsequent stage, there can be provided a highly-efficient projection type display apparatus without increasing the size of the light source device.

Embodiment 1

Explanation has been made above ideally by referring to the above light ray diagrams as to the ways in which a light source device having a plurality of light sources is used and the light fluxes from the light source device are condensed to a single light flux and then incident on an illumination optical system provided in a subsequent stage; thereby a highly-efficient projection type display apparatus can be provided without increasing the size of the light source device.

Figure 4A:
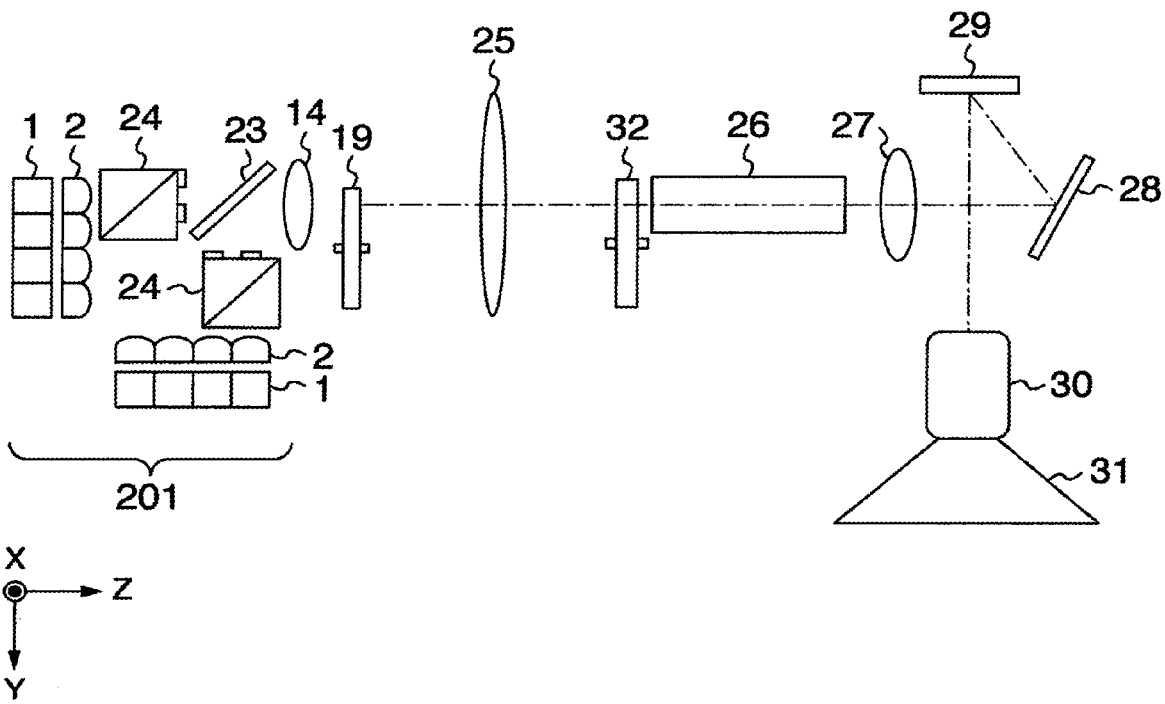
FIGS. 4A and 4B schematically illustrate arrangements of a projection type liquid-crystal display apparatus in accordance with one embodiment of the present invention respectively.
Figure 4B:
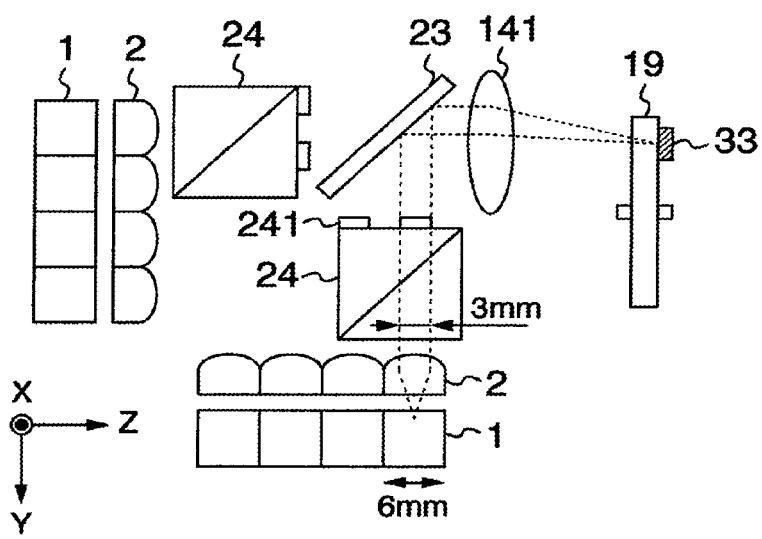

Explanation will be made next as to the present embodiment in which required accuracy of an illumination region on the transparent base material is determined, by referring to FIGS. 4A to 4C. FIG. 4A illustrates an arrangement of the major part of a projection type liquid crystal display apparatus in a YZ cross-sectional plane including an illumination optical axis as viewed from an X axis direction, FIG. 4B illustrates an enlargement of the major part of a projection type liquid crystal display apparatus in the YZ cross-sectional plane including an illumination optical axis as viewed from the X axis direction, and FIG. 4C illustrates an arrangement of the major part from an illumination light source device to a light tunnel in an XZ cross-sectional plane including an illumination optical axis as viewed from a Y axis direction.

An illumination light source device 201 is used as the illumination light source device, while an image display element (DMD element) having a plurality of arranged very small mirrors is used as the illumination optical system provided in a subsequent stage.

Figure 4C:
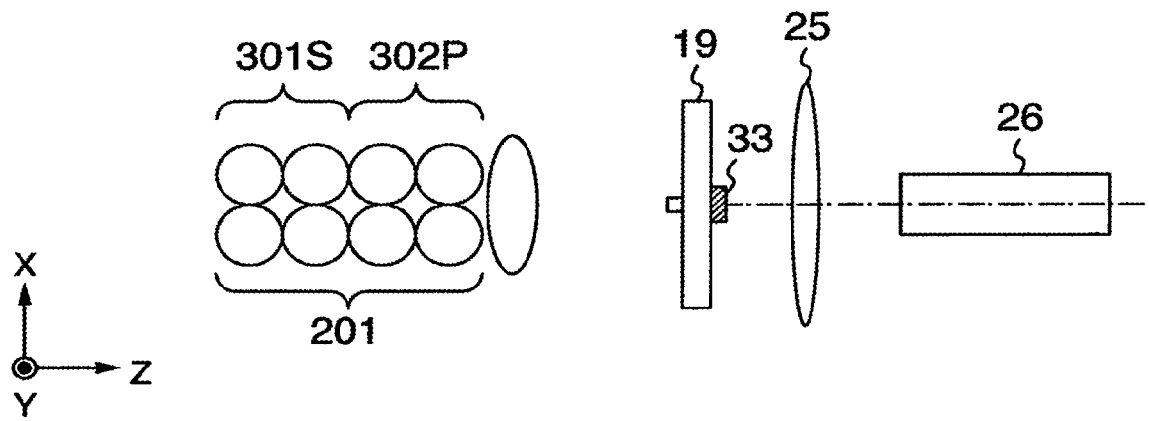
FIG. 4C schematically illustrates structures of parts of the arrangements of FIGS. 4A and 4B.

FIG. 4C illustrates an arrangement of the illumination light source device in the X axis direction. The illustrated illumination light source device 201 has two light source element units 1 and two collimating lenses 2 also in the X axis direction, that is, it has totally sixteen light source element units 1 and totally sixteen collimating lenses 2.

As illustrated in FIG. 4A, the light fluxes emitted from the illumination light source device 201 are condensed by a condensing lens 25, and then incident on the incident side opening of a light tunnel 26. Since the condensing lens 25 focuses the light, which is formed on the transparent base material 19 and diffused from an illumination region 33 of the light source element unit 1, on an incident side of the light tunnel 26, the illumination region 33 of the light source element unit 1 formed on the transparent base material 19 is projected on the incident side of the light tunnel 26 in an enlarged manner.

The light tunnel 26 has reflecting surfaces at four inside surfaces, and the incident light ray is reflected by a plurality of number of times by the inside reflecting surfaces until the ray reaches its exit side opening. Thus, an illumination distribution having a high uniformity causing practically no problem can be obtained at the exit side of the light tunnel 26. The light fluxes emitted from the light tunnel 26 are projected on a DMD element 29 (which modulates the intensity of the incident light corresponding to an image signal) through a lens element 27 and by a reflecting mirror 28 in an enlarged manner.

The light fluxes incident on the DIVED element 29 are directed toward a projection lens 30 according to the image signal and then reach a screen 31. Though a color wheel 32 for conducting color separation of white color light is provided in front of the light tunnel 26, the color wheel 32 is not necessary when the illumination light source device 201 has a function of color time division.

The accuracy required for the illumination region 33 will be explained in detail by referring to FIG. 4B. Assume that the light source element unit 1 is a blue color laser and the phosphor of the transparent base material 19 is excited. Also assume that the light source element 1 has an outside diameter of 6 mm, the emitted light flux has a diameter of 0.02 mm, and the light source element unit has an exit light half angle of 20 degrees.

Since the polarizing prism 24 has an outside size corresponding to about two light source elements 1, that is, has an outside width of 12 mm. Since the four light fluxes of the light source elements 1 pass through the width of 12 mm of the exit surface of the polarizing prism 24, the light fluxes emitted from the light source elements 1 are required to have a diameter not larger than 3 mm. Since the light source element unit 1 has the exit light half angle of 20 degrees, the collimating lenses 2 has a focal length of about 4 mm.

In this case, an emission light image of the light source element unit 1 is projected in an enlarged manner on the transparent base material 19 in the form of the illumination region 33, and the magnification corresponds nearly to a ratio between the focal length of the condensing lens 141 and the focal length of the collimating lens 2. The illumination region 33 provides a light source size for an illumination optical system located in a latter stage, and since an ultra high voltage mercury lamp in the prior art has an arc image of about 1 mm size, the illumination region 33 is required to have a size not larger than 1 mm. Since the light source element 1 has an emission flux diameter of 0.02 mm, the enlargement or magnification is required to be not larger than about 50 and is set at 5 with a sufficient allowance.

In this case, the focal length of the condensing lens 141 is 20 mm and the light emission surface enlarged image of the light source element 1 has a diameter of about 0.1 mm.

Figure 5:
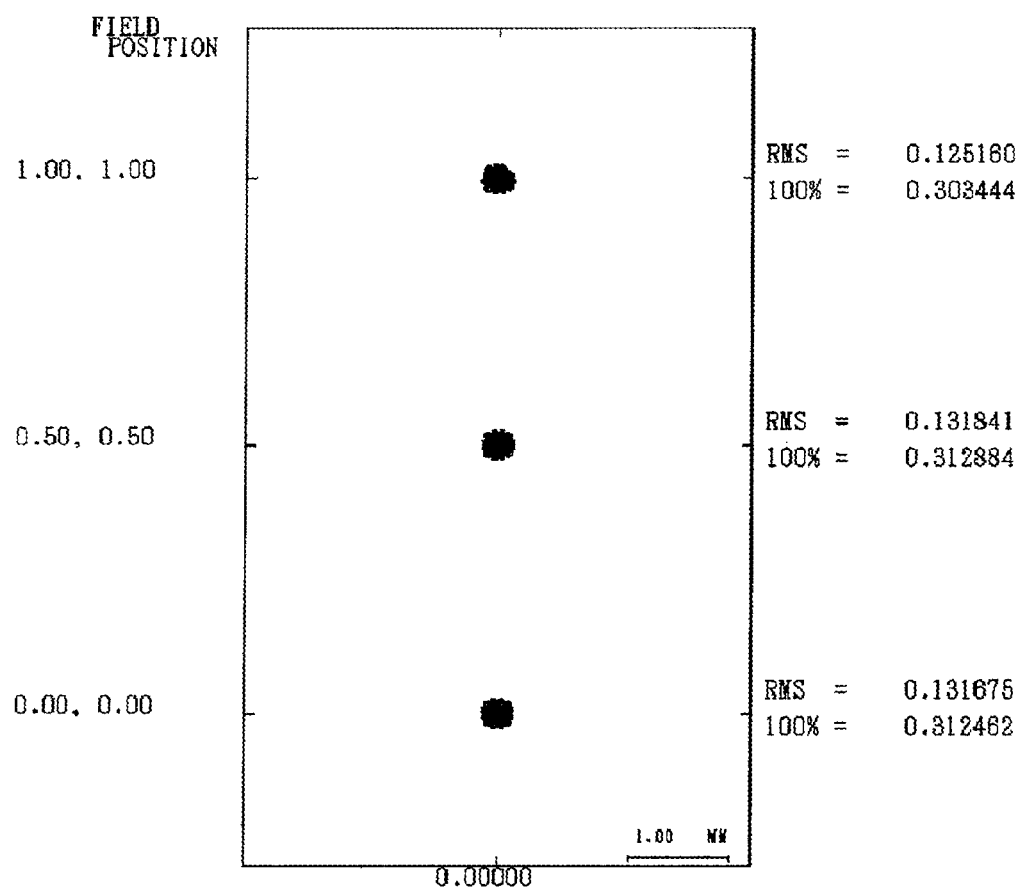
FIG. 5 is a diagram for representing light spots on a transparent base material formed by light sources.

Light spots, formed by light fluxes emitted from the light source element unit 1 on the transparent base material 19 at the illumination region 33 under aforementioned conditions, are represented in FIG. 5. An inexpensive spherical lens is used as the condensing lens 141. In this case, the spot has a size diameter of about 0.3 mm, and even when an enlarged image of a diameter of 0.1 mm is included, the spot is suppressed to a size level not larger than 1 mm. As a result, this light source device can have a high efficiency even for the illumination optical system provided in a subsequent stage.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A projection type display apparatus comprising:
a first and a second illumination light source devices;
an image display element;
an illumination optical system having a plurality of optical elements which illuminates the image display element with light from the first and the second illumination light source devices; and
a projection lens which enlarges an optical image formed by the image display element and projects the enlarged image;
wherein the illumination optical system has first array lens and second array lens each of which has a plurality of lens elements arranged in a matrix form, each lens having a rectangular shape opening and;
wherein the first and the second illumination light source devices each has
a pair of light source units configured by combining a light source of P polarized light having a polarization degree greater than 50% and a light source of S polarized light having a polarization degree greater than 50%,
a polarizing prism which transmits one type polarized light and reflects other type polarized light, and
a polarization conversion element;
wherein the first and a second illumination light source devices are arranged such that the polarization directions of light fluxes having high polarization degrees becomes perpendicular to each other, light fluxes from the first light source unit of the first illumination light source device and from the second light source unit of the second illumination light source device are combined by the polarizing prism, among the combined light fluxes a polarization direction of the light flux from any one of the first light source unit or the second light source unit is changed such that a polarization direction of the light flux becomes perpendicular to a polarization direction of the light flux before changed by the polarization conversion element; and
wherein the light flux from the first illumination light source device is P polarized light, the light flux from the second illumination light source device is S polarized light, the light fluxes are combined by the polarizer which transmits P polarized light and reflects S polarized light and provided in a subsequent stage of the first and second illumination light source devices, the light fluxes are condensed to a single region by a light-flux condensing means, and then directed toward the illumination optical system located in a subsequent stage.

2. A projection type display apparatus according to claim 1, wherein the light source is a laser.

* * * * *